(12) United States Patent
Haslinger

(10) Patent No.: US 9,768,575 B2
(45) Date of Patent: Sep. 19, 2017

(54) DEVICE FOR STRIPPING A CABLE

(71) Applicant: Komax SLE GmbH & Co., KG, Grafenau (DE)

(72) Inventor: Thomas Haslinger, Windorf (DE)

(73) Assignee: KOMAX SLE GMBH & CO., KG, Grafenau (DE)

( * ) Notice: Subject to any disclaimer, the term of this patent is extended or adjusted under 35 U.S.C. 154(b) by 123 days.

(21) Appl. No.: 14/532,365

(22) Filed: Nov. 4, 2014

(65) Prior Publication Data

US 2015/0128414 A1    May 14, 2015

(30) Foreign Application Priority Data

Nov. 8, 2013   (DE) .................. 10 2013 018 834

(51) Int. Cl.
*B23P 19/00*        (2006.01)
*H01R 43/00*        (2006.01)
(Continued)

(52) U.S. Cl.
CPC ............. *H01R 43/05* (2013.01); *H02G 1/127* (2013.01); *H02G 1/1256* (2013.01);
(Continued)

(58) Field of Classification Search
CPC .... H02G 1/127; H02G 1/1209; H02G 1/1241; Y10T 156/1052; Y10T 29/53217; B21F 11/00; H01R 43/00; H01R 43/05
(Continued)

(56) References Cited

U.S. PATENT DOCUMENTS 3,774,478 A    11/1973  Carpenter et al. ....... H02G 1/12
4,869,135 A     9/1989  Hoffa
(Continued)

FOREIGN PATENT DOCUMENTS

DE      26 54 766 A1     6/1978
DE         4325356       9/1994    ............. H01R 43/05
(Continued)

OTHER PUBLICATIONS

Office Action from the Chinese Patent Office dated Jul. 20, 2016 in related Chinese application No. 201410631139.6, and machine translation thereof.

(Continued)

*Primary Examiner* — Thiem Phan
(74) *Attorney, Agent, or Firm* — J-TEK Law PLLC; Jeffrey D. Tekanic; Scott T. Wakeman

(57) ABSTRACT

A device for simultaneously stripping at least two cable ends surrounded by insulation material includes a cutting device having first and second cutters that are movable relative to each other in a direction perpendicular to the longitudinal direction of the cable ends. The cutting edges of the first and second cutters are disposed substantially in the same plane and are movable towards each other such that the cutting edges simultaneously cut into the insulation material of the at least two cable ends. In addition, the cutting device and the cable ends are movable relative to each other in the longitudinal direction of the cable ends to simultaneously pull-off the cut insulation material from the at least two cable ends and thereby strip the at least two cable ends.

14 Claims, 6 Drawing Sheets

(51) Int. Cl.
  *H01R 43/05* (2006.01)
  *H02G 1/12* (2006.01)
(52) U.S. Cl.
  CPC ...... *H02G 1/1295* (2013.01); *Y10T 29/49192* (2015.01); *Y10T 29/53217* (2015.01); *Y10T 83/0467* (2015.04); *Y10T 83/2096* (2015.04)
(58) Field of Classification Search
  USPC .............. 29/749, 564.4, 753, 755, 825, 867; 81/9.42, 9.51
  See application file for complete search history.

(56) References Cited

U.S. PATENT DOCUMENTS

| | | | |
|---|---|---|---|
| 4,932,110 A | 6/1990 | Tanaka | |
| 5,025,549 A * | 6/1991 | Hornung | H01R 43/052 29/564.4 |
| 5,469,763 A * | 11/1995 | Hoffa | H02G 1/1256 29/564.4 |
| 5,526,717 A | 6/1996 | Koch | |
| 5,797,299 A | 8/1998 | Long, Jr. | H02G 1/12 |
| 2002/0166236 A1 | 11/2002 | Bernardelle et al. | |
| 2005/0087055 A1 | 4/2005 | Ruchti | |

FOREIGN PATENT DOCUMENTS

| | | | |
|---|---|---|---|
| DE | 4325356 C1 | 9/1994 | |
| DE | 197 52 452 A1 | 5/1998 | |
| DE | 689 20 497 T3 | 4/2000 | |
| DE | 602 13 318 T2 | 8/2007 | |
| EP | 0 623 982 A1 | 11/1994 | |
| EP | 0 352 038 B1 | 1/1995 | |
| EP | 1258960 | 11/2002 | ............... H02G 1/12 |
| EP | 1258960 A2 | 11/2002 | |
| EP | 1 257 028 B1 | 7/2006 | |
| EP | 1 528 643 B1 | 2/2007 | |
| EP | 2190080 | 5/2010 | ........... H01R 43/048 |
| EP | 2190080 A2 | 5/2010 | |
| JP | H03226211 A | 10/1991 | |
| JP | H10-322833 | 12/1998 | ............... H02G 1/12 |
| JP | H10322833 A | 12/1998 | |

OTHER PUBLICATIONS

Extended European Search Report dated Jun. 2, 2015 in counterpart European application No. EP 14191890.4, and a translation of substantive portions thereof.

Office Action from counterpart German application No. 10 2013 018 834.2 dated Aug. 5, 2014, with an English translation of substantive portions thereof attached thereto.

Office Action from the Chinese Patent Office dated May 3, 2017 in related Chinese application No. 201410631139.6, and machine translation thereof, as well as machine translation of updated Search Report.

Communication dated Mar. 31, 2017 from the EPO in counterpart EP application No. 14 191 890.4, including English translation of substantive rejections.

* cited by examiner

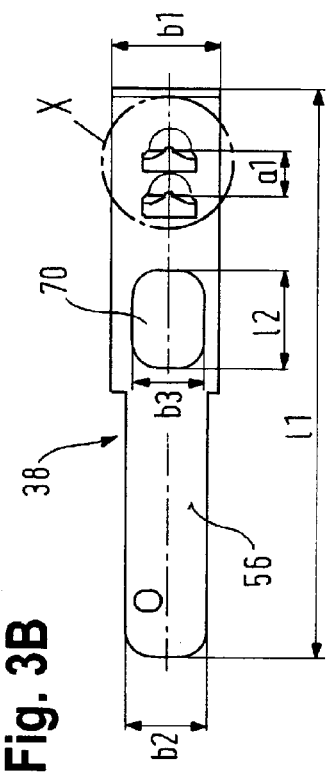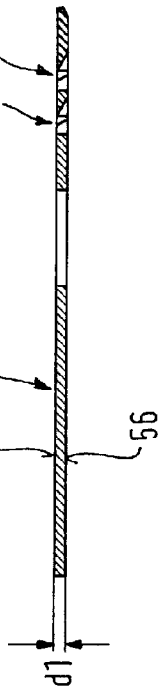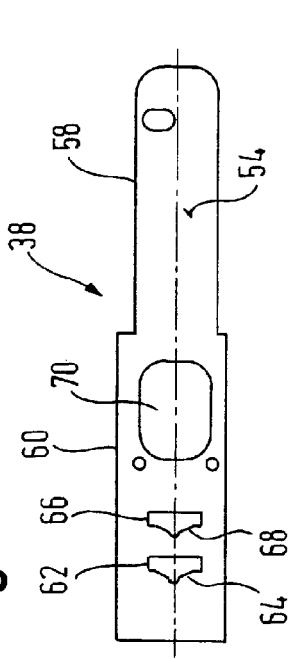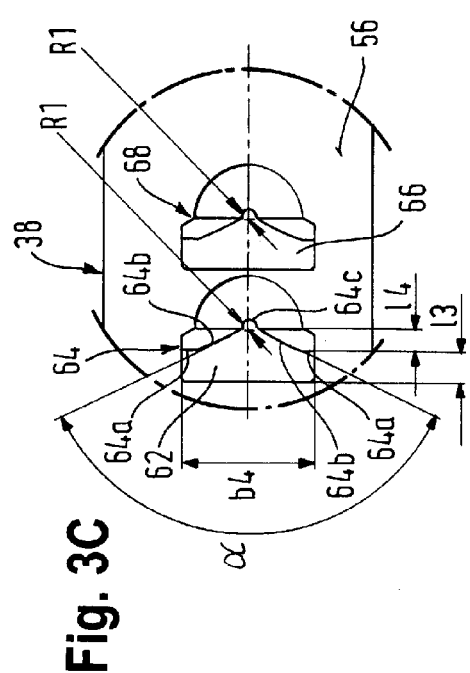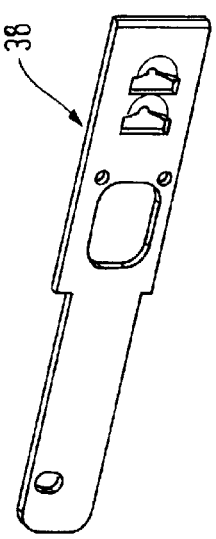
Fig. 3B
Fig. 3D
Fig. 3A
Fig. 3C
Fig. 3E

DEVICE FOR STRIPPING A CABLE

CROSS-REFERENCE

The present application claims priority to German patent application serial number 10 2013 018 834.2 filed on Nov. 8, 2013, the contents of which are incorporated fully herein by reference.

TECHNICAL FIELD

The present invention relates to devices and methods for simultaneously stripping at least two cable ends each of which is surrounded by an insulation material.

BACKGROUND ART

A processing device is known from U.S. Pat. No. 7,607,217 and its counterpart EP 1 528 643 A1 wherein a cutting head of a cutting unit cuts into the cable end to remove the insulation and separates contacts having a defective crimp connection from the cable end.

A wire cutting and stripping mechanism is known from U.S. Pat. No. 5,797,299 and its counterpart DE 197 52 452 A1, wherein an insulated, single-wire (single core) continuous wire can be cut into wire segments having a predetermined length. The ends resulting from the cutting, i.e. an end of the cut-off wire and an end of the continuous wire, are simultaneously stripped after the cutting by moving the corresponding wire ends in the direction of the wire.

SUMMARY OF THE INVENTION

It is an object of the present disclosure to disclose techniques for simplifying and speeding up an operation for stripping, or optionally for stripping and crimping, at least two cable ends that extend substantially in parallel and are each surrounded by an insulation material.

A device according to one representative, non-limiting embodiment of the present disclosure preferably comprises a cutting device that includes a first cutter that is movable relative to a second cutter. The respective cutting edges of the first and second cutters are disposed substantially or nearly in the same plane. Furthermore, the cutting device is configured to move the respective cutting edges of the first and second cutters towards each other such that the cutting edges simultaneously cut into the insulation material of first and second cable ends, which extend at least substantially in parallel. The cutting device is further configured to move and thereby simultaneously pull-off of the insulation material from the first and second cable ends, which causes the first and second cable ends to be stripped, thereby exposes the conductors (the bare conducting wires) disposed therein.

By using the features of the above-described exemplary embodiment, it is possible, for example, to significantly increase the speed at which the two cable ends are stripped prior to a crimping process. Furthermore, the subsequent crimping process itself also can be significantly sped up because the stripped cable ends are already disposed in the position necessary for the crimping, thereby eliminating the need for time-consuming alignment adjustments to arrange the stripped cable ends in the correct positions to have the connectors (leads) crimped thereon.

BRIEF DESCRIPTION OF THE DRAWINGS

Further objects, features, embodiments and advantages of the present disclosure will become apparent from the following description of exemplary embodiments and the Figures, in which:

FIGS. 3A-E show different views of a first cutter of the stripping device according to the first embodiment, FIG. 5C shows a stripping-cutting position, and FIG. 5D shows a closed cutter position, and FIGS. 6A and B show different views of a guide device of the stripping device according to the first embodiment.

DETAILED DESCRIPTION OF THE EMBODIMENTS

Figure 1:
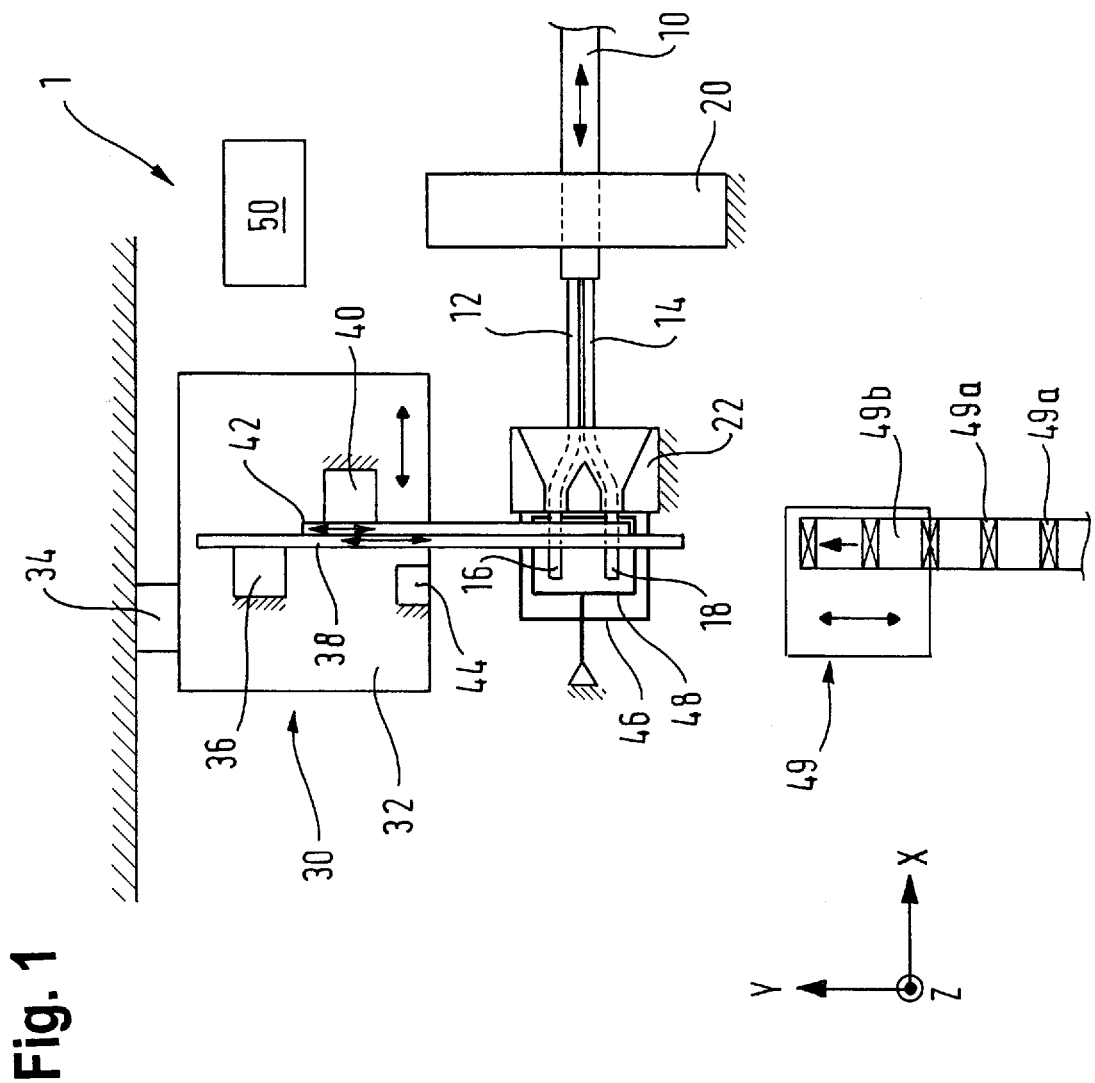
FIG. 1 shows a plan view of a stripping and crimping device according to a first embodiment of the present disclosure.
Figure 2:
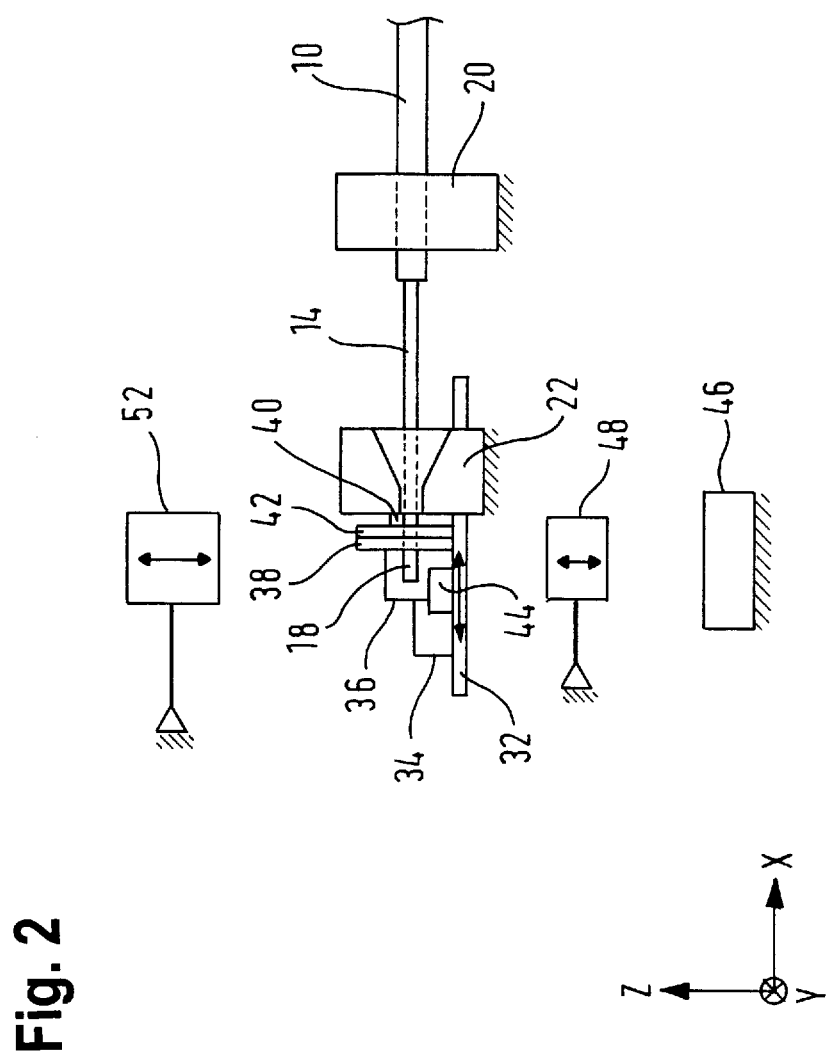
FIG. 2 shows a side view of parts of the stripping and crimping device according to the first embodiment.
Figure 4A:
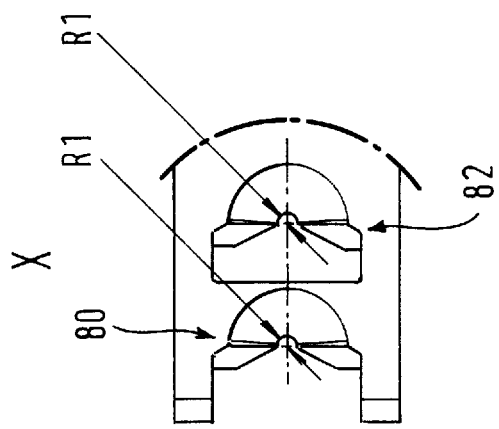
FIGS. 4A-D show different views of a second cutter of the stripping device according to the first embodiment.
Figure 4B:
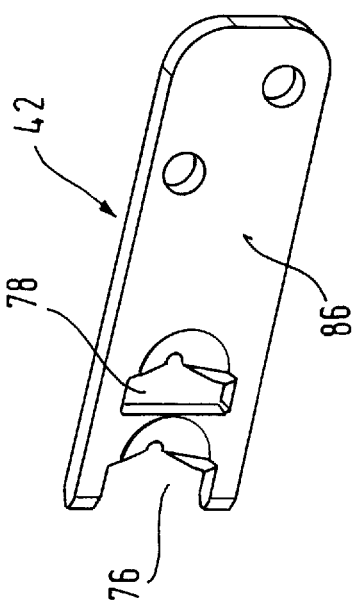
Figure 4C:
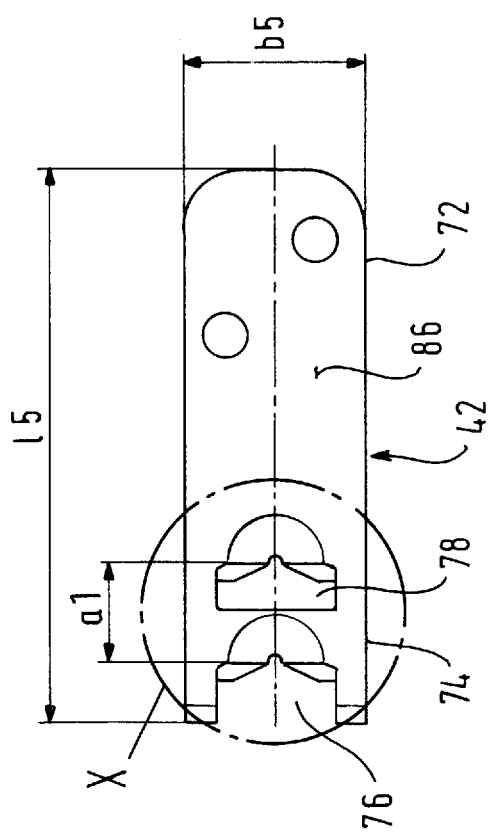
Figure 4D:
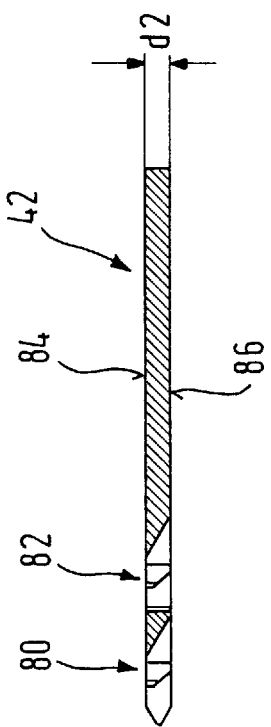

FIG. 1 shows a schematic view of parts of a device 1 for stripping and crimping according to a first embodiment. FIG. 2 shows a schematic side view of the device 1. In the following, components and features of the device 1 for stripping and crimping are first described, using which the simultaneous stripping of two cable ends is achieved.

FIG. 1 shows a multi-wire (multi-core) electric line 10 which includes a first insulated cable 12 (first wire or first conductor) and a second insulated cable 14 (second wire or second conductor). The insulated cables 12, 14 extend in a protective jacket (casing) substantially in parallel to each other in the electric line 10. No protective jacket is present along the end region. Each insulated cable 12, 14 is surrounded by a sheath made from an insulation material to insulate (isolate) the conductor (core) material from the surrounding environment. The conductor (core) material may comprise, e.g., copper, aluminum, steel, silver and/or other electrically conductive materials; the insulation material may comprise an electrically insulating polymer, such as thermoplastics including but not limited to polyethylene and polyvinyl chloride. The first insulated cable 12 ends in a first cable end 16, and the second insulated cable 14 ends in a second cable end 18.

In FIG. 1 a cable fixing (clamping/holding) device 20 is schematically shown, using which the electric line 10 or the insulated cables 12, 14 can be fixed or clamped during the stripping and crimping operations. For example, the fixing device 20 can be comprised of two or more clamping jaws which are movable towards one another to clamp the electric line 10 or the insulated cables 12, 14 or their cable ends 16, 18 therebetween.

In addition, FIG. 1 shows a guide device 22 which will be described in more detail below. The guide device 22 is configured such that the cable ends 16, 18 of the insulated cables 12, 14 can be held in a predetermined position and at a predetermined distance (spacing) with respect to each other.

FIG. 1 further shows a cutting device 30, using which the cable ends 16, 18 can be stripped and/or cut off. The cutting device 30 includes a base plate 32 that is movable, by a first drive device 34, in a direction (in the X-direction in FIG. 1) extending parallel to the cable ends (16, 18). The first drive device 34 may comprise, e.g., a linear motor, or a rotary motor operably coupled to a rotational-to-linear motion converting mechanism (such as, e.g., a rack- and pinion- drive or a worm-drive). A second drive device 36 is attached to the base plate 32 as part of the cutting device 30. Using the second drive device 36, a first cutter 38 can be moved and guided in a direction (in the Y-direction in FIG. 1) extending perpendicular to the direction of the cable ends 16, 18. The first cutter 38 can be guided, for example, along a rail or groove (not shown) which is defined (present) on the base plate 32. The movement in the Y-direction also can be achieved, for example, using a linear motor, or a rotary motor operably coupled to a rack-and-pinion-drive or a worm-drive (not shown), which linearly drives (moves) the first cutter 38 in the Y-direction. Furthermore, a second cutter 42 can also be movably held or guided on the base plate 32 in a similar manner, by a third drive device 40, in a direction perpendicular to the direction of the cable ends 16, 18. The third drive device 40 also may comprise a linear motor or a rotary motor operably coupled to a rotational-to-linear motion converting mechanism (such as, e.g., a rack- and pinion-drive or a worm-drive). The first and second cutters 38, 42 are preferably disposed with respect to each other such that they slidably contact each other. The relative positions of the first and second cutters 38, 42 and their precise design are described in more detail below. By using the cutters 38, 42, it is possible to simultaneously strip off and/or simultaneously cut the insulation material from the first cable end 16 and the second cable end 18.

A sensor 44 is preferably disposed on the base plate 32. The sensor 44 is configured to detect whether the cable ends 16, 18 protrude by a predetermined length of cable from the guide device 22 into the cutters 38, 42. Alternatively or additionally, the sensor 44 can be configured to detect, for example, the amount of the length the cable ends 16, 18 that protrudes from the side of the first cutter 38 facing the sensor 44.

In addition, FIG. 1 schematically shows an insulation material collecting trough 46 and a multiple crimp anvil (in this embodiment, a double crimp anvil) 48. In addition, a control device 50 is schematically shown in FIG. 1, which is (electrically) connected to the fixing device 20, the first drive device 34, the second drive device 36, the third drive device 40, and the sensor 44.

FIG. 2 shows a simplified schematic side view of the device shown in FIG. 1. Supplemental to FIG. 1, FIG. 2 schematically shows a multiple crimp punch (in this embodiment, a double crimp punch) 52 that, as is apparent from FIG. 2, is vertically movable to simultaneously crimp a plurality of crimp connectors or crimp sleeves onto the cable ends 16, 18. As is further apparent from FIG. 2, the multiple crimp anvil 48 is also configured such that it is vertically movable to perform the crimping process. The multiple crimp anvil 48 and multiple crimp punch 52 work together (cooperate) to perform the crimping. It is noted for the sake of clarity that FIG. 2 does not show all of the components depicted in FIG. 1 (for example, the drive devices 34, 36, and 40 are not shown in FIG. 2). The movement of both the multiple crimp anvil 48 and the multiple crimp punch 52 can be controlled by the control device 50.

FIGS. 3A-E show different views of the first cutter 38. The first cutter 38 is formed (e.g., cut or punched) from an overall rectangular plate having a first length l1 and a first width b1. The rectangular plate has a front surface 54 (shown in FIG. 3A) and a rear surface 56 (shown in FIG. 3B). Furthermore, the first cutter 38 is divided along its longitudinal direction into a guide region 58 and a cutting region 60, which in this embodiment each have a length of approximately ½×l1 (i.e. one-half of the length l1). The guide region 58 has a second width b2. The cutting region 60 has the first width b1. The first cutter 38 has a first thickness d1.

Three cutouts are formed in the cutting region 60 of the first cutter 38. A first cutout 62 is substantially rectangular and has a fourth width b4 and a third length l3. The first cutout 62 is disposed farthest away from the guide region 58. A first cutting edge 64 is formed by (along an edge of) the first cutout 62. The first cutting edge 64 is formed on the front surface 54 of the first cutter 54 on the side of the first cutout 62 which is disposed farthest away from the guide region 58. The first cutting edge 64 is preferably formed such that, after the formation (manufacture) of the first cutout 62, e.g., by cutting or punching, the side of the edge of the first cutout 62 which is disposed remote (farthest) from the guide region 58 is ground or abraded only from the rear surface 56. The first cutting edge 64 is thereby formed in this region, and the cutting edge 64 lies substantially in the same plane as the front surface 54.

An enlarged view of the first cutting edge 64 is depicted in FIG. 3C. As is apparent from FIG. 3C, overall the first cutting edge 64 extends symmetrically with respect to a plane of symmetry extending centrally through the first cutout 62 in the longitudinal direction and in the thickness direction of the first cutter 38. More specifically, the first cutting edge 64 extends first from the upper/lower edge region in the width direction of the first cutout 62 perpendicular to the longitudinal direction of the first cutter 38 towards the center (perpendicular cutting edge region or border region 64a). The first cutting edge 64 subsequently extends, due to deeper grinding, obliquely towards the center and away from the guide region (V-shaped cutting edge region 64b). In a central region (through which the plane of symmetry also extends) the first cutting edge 64 is formed in the shape of a semicircle that is open towards the guide region 58 (semicircular cutting edge region 64c). The further extent (i.e. the rest of the first cutting edge 64) is formed symmetrical to the above-described portion of the first cutting edge 64. The first cutting edge 64 thus has border regions 64a extending overall perpendicular to the longitudinal direction and a V-shaped region 64b extending obliquely inward, which has a semicircular central region 64c. The main cutting direction (i.e. the direction that the first cutter 38 moves when it cuts, which will hereinafter be called the "positive Y-direction") extends in the longitudinal direction of the first cutter 38 from the cutting region 60 towards the guide region 58. That is, in order to perform a cutting operation, the first cutter is moved in the direction from the cutting region 60 towards the guide region 58. The V-shaped region is open towards the guide region 58 with a first angle α, i.e. the V-sides extend at the angle α with respect to each other. The semicircle has a first radius R1. The V-shaped region has (extends with) a fourth length l4 in the longitudinal direction.

A second cutout 66, which is identical or substantially identical to the first cutout 62, is formed offset towards the guide region 58. Similar to the first cutout 62, a second cutting edge 68 is formed with (along) the second cutout 66 on the front surface 54 of the first cutter 38. The first and second cutouts 62, 66 are disposed such that mutually corresponding positions of the cutting edges 64, 68 each have (are separated by) a first distance or spacing (also referred to as pitch) a1 to each other in the longitudinal direction. In particular, the center points of the semicircular cutting edges have (are separated by) the first distance (center distance) a1 in the central region of the cutting edges.

The first cutter 38 further includes a third cutout 70 which is formed offset farther towards (i.e. closer to) the guide region 58 than the first and second cutouts 62, 66.

The third cutout has a third width b3 and a second length l2. Furthermore, additional cutouts and/or bores (shown but not numbered) are provided in the guide region 58 and the first cutter 38 can be connected to the second drive device 36 by using these cutouts and/or bores. FIGS. 3D and E show further views of the first cutter 38.

The thus-formed first cutter 38 is disposed in the assembled stripping device, as shown in FIG. 1, such that its longitudinal direction extends in the Y-direction, i.e. perpendicular to the direction of the cable ends 16, 18, and the width direction of the cutter 38 extends in the Z-direction, which is perpendicular to both the X-direction and the Y-direction. Furthermore, the front surface 54 of the first cutter 38 points towards (faces) the second cutter 42, i.e. towards the guide device 22.

FIGS. 4A-D show different views of the second cutter 42. The second cutter 42 is formed from an overall rectangular plate having a fifth length l5, a fifth width b5 and a second thickness d2. Similar to the first cutter 38, the second cutter 42 has a guide region 72 and a cutting region 74 (whose widths are identical in this embodiment). A third cutting edge 80 and a fourth cutting edge 82 are formed in the cutting region 74 by a third cutout 76 and a fourth cutout 78, respectively, in the same manner or substantially the same manner as in the first cutter 38. In contrast to the first cutter 38, however, the third and fourth cutting edges 80, 82 are disposed mirror-inverted with respect to an axis perpendicular to the longitudinal direction of the cutter 42 on the side of each cutout 76, 78 that lies closer to the guide region 72. The third and fourth cutting edges 80, 82 lie in a plane with a rear surface 84. This is achieved by respectively abrading (grinding) the edges of the cutouts 76, 78 starting from a front surface 86 to form the cutting edges 80, 82. Furthermore, the third cutout 76 is formed in (at or along) the edge region of the second cutter 42 such that it is open in the longitudinal direction. That is, the third cutout 76 is formed open in a substantially C-shaped manner. The main cutting direction (i.e. the direction that the second cutter 42 moves when it cuts, which will hereinafter be called the "negative Y-direction") extends in the longitudinal direction of the second cutter 42 in the direction from the guide region 72 towards the cutting region 74. Therefore, as well be discussed further below, the cutters 38, 42 move in the opposite directions along the Y-direction in order to perform a stripping and/or cutting operation.

The spacing of the third cutting edge 80 and the fourth cutting edge 82 of the second cutter 42 in the longitudinal direction corresponds to the first distance a1 between the first cutting edge 64 and the second cutting edge 68 of the first cutter 38. In this embodiment the guide region 72 includes, for example, two cutouts or bores (shown but not numbered) for attaching to the third drive device 40.

The second cutter 42 is preferably installed in the cutting device 30 shown in FIGS. 1 and 2 such that the rear surface 84 of the second cutter 42 can slide on (along) the front surface 54 of the first cutter 38. That is, the first cutter 38 and the second cutter 42 are held (pressed) against each other by the drive devices 36, 40 and by optional guide devices, such as for example rails. Therefore, the (facing) sides of the cutters 38, 42, on which the respective cutting edges 64, 68, 80, 82 are disposed, slide against each other. The cutting edges 64, 68, 80, 82 are thus substantially coplanar, i.e. disposed in substantially in the same plane. Alternatively the two cutters 38, 42 can be guided very close to each other, i.e. in parallel but spaced slightly apart. The first and second cutting edges 64, 68 of the first cutter 38 are disposed such that their main cutting direction extends in the opposite direction to the main cutting direction of the third and fourth cutting edges 80, 82 of the second cutter 42. In other words, the cutting edges 64, 68 of the first cutter 38 cut in the positive Y-direction in FIG. 1, while the cutting edges 80, 82 of the second cutter 42 cut in the negative Y-direction in FIG. 1. The first cutter 38 and the second cutter 42 are disposed relative to each other such that the first cutting edge 64 and the third cutting edge 80, and the second cutting edge 68 and the fourth cutting edge 82, can respectively cooperate to cut into a cable end by moving the cutters 38, 42 relative to each other in the Y-direction.

Figure 5A:
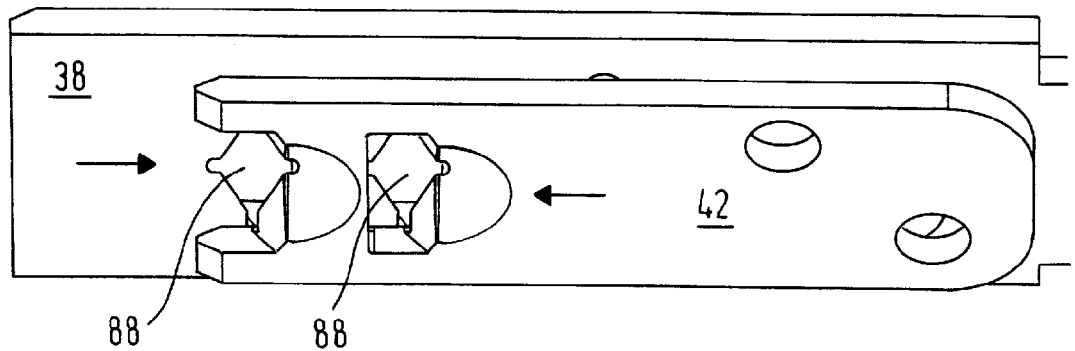
FIGS. 5A-D show different cutter positions of the stripping device, wherein FIGS. 5A and B show open cutter positions.
Figure 5B:
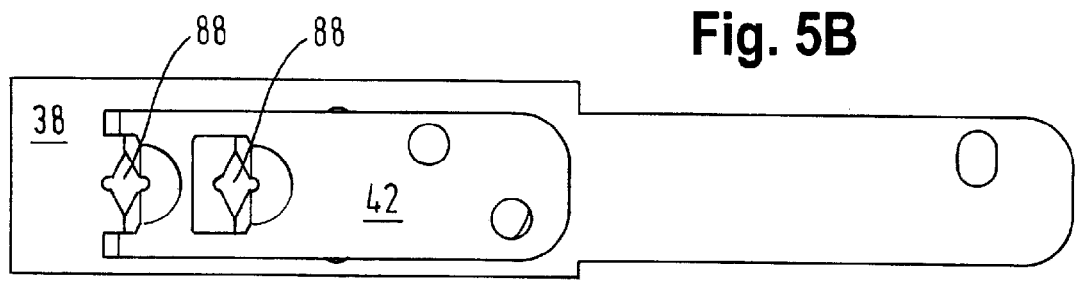

As shown in FIGS. 5A-D, different cutter positions can be formed by the movement of the first cutter 38 relative to the second cutter 42 in the Y-direction. FIGS. 5A and B show an "open cutter position". In this open cutter position the first and second drive devices 36, 40 dispose the first cutter 38 relative to the second cutter 42 such that two through-openings 88 are formed through the cutters 38, 42 by superimposing the first cutout 62 on (with) the third cutout 76, and by superimposing the second cutout 66 on (with) the fourth cutout 78. In the present embodiment, substantially rhombus-shaped through-openings 88 are formed by the V-shaped regions 64b of the cutting edges 64, 68, 80, 82. The size of the through-openings 88 thus formed can be set or dimensioned in the open cutter position such that the cable ends 16, 18, which are sheathed (jacketed or covered) with the insulation material, can be inserted through the superimposed cutouts 62, 66, 76, 78 of the cutters 38, 42 (i.e. through the through-openings 88) without contacting the cutting edges 64, 68, 80, 82.

Figure 5C:
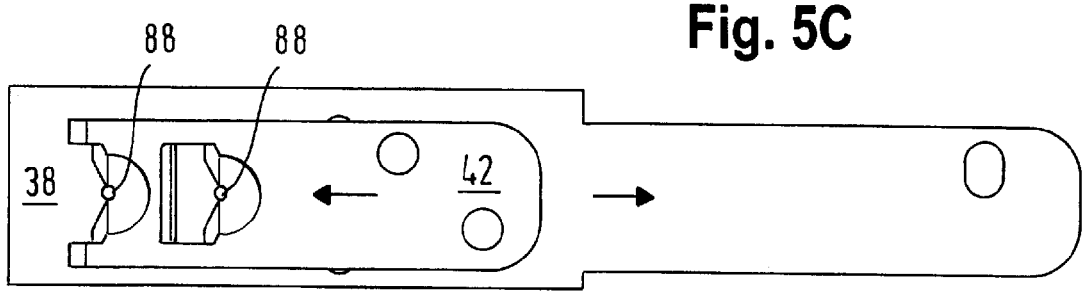

FIG. 5C shows a "stripping-cutting position". In this stripping-cutting position the first and second cutting edges 64, 68 and the third and fourth cutting edges 80, 82 are moved so far towards each other that the through-openings 88 are now formed (defined) only by the central semicircular regions 64c of the cutting edges 64, 68, 80, 82. In this stripping-cutting position, cooperating cutting edges 64, 68, 80, 82 respectively form a circle.

Figure 5D:
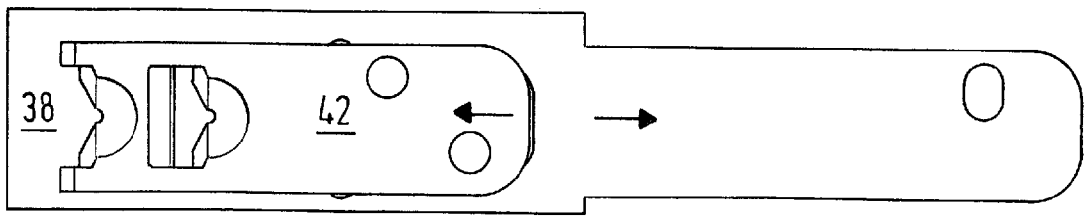

FIG. 5D shows a "closed cutter position", wherein the first cutter 38 and the second cutter 42 are moved still further in their respective cutting directions, so that the through-openings 88 are no longer present. This position can also be referred to as the cutting-off position.

Figure 6A:
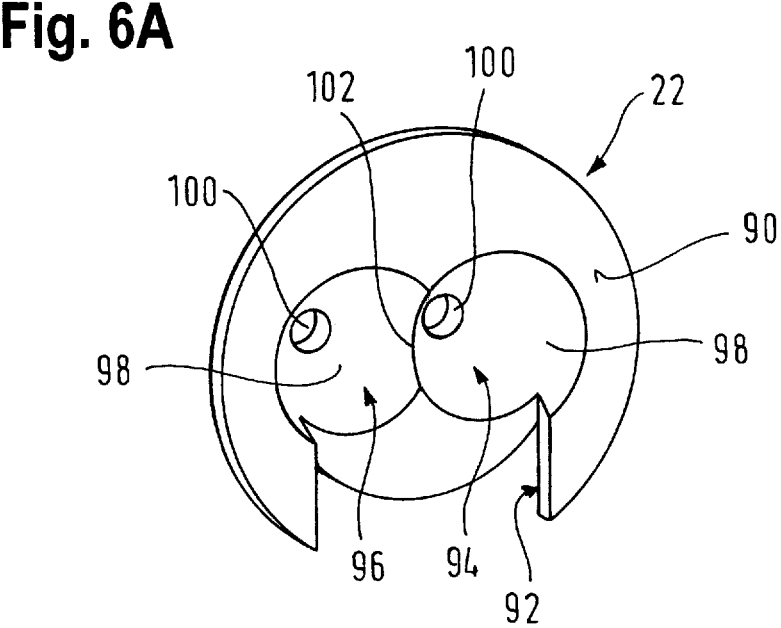
Figure 6B:
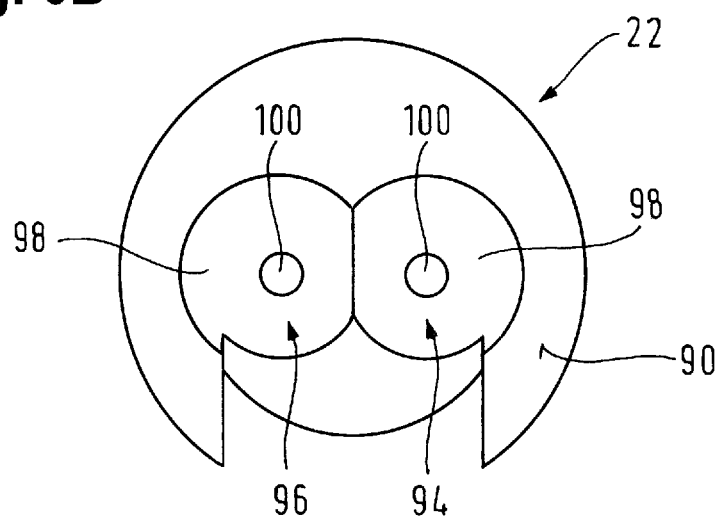

FIG. 6A shows a rear-side, three-dimensional (perspective) view of the guide device 22 and FIG. 6B shows a front-side view of the guide device 22. The guide device 22 has an insertion side (rear side) 90 and an output side (front side) 92. The insertion side 90 and the output side 92 are connected to (communicate with) each other via a first passage 94 and a second passage 96. The first passage 94 and the second passage 96 are each formed in a funnel-shaped manner and taper starting from the insertion side 90, first conically inwards towards the output side 92, and subsequently they extend in a tubular (e.g., circular cylindrical) manner up to the output side 90. That is, the first passage 94 and the second passage 96 each have a conical region 98 and a tubular region 100. The tubular regions 100 are formed concentric with the conical regions 98. The distance of the central axis through the first passage 94 to the central axis through the second passage 96 (i.e., the center distance between the first passage 94 and the second passage 96) preferably corresponds to the first distance a1 between the first cutting edge 64 and the second cutting edge 68. The radii of the conical regions 98 on the insertion side 90 (i.e. the greatest radii of the conical regions 98) are greater than ½×a1 (i.e. one-half of the distance a1). Furthermore, the conical regions 98 of the first and second passages 94, 96 at least partially overlap each other. A separating edge 102 between the first passage 94 and the second passage 96 is formed (defined) by this overlap. The separating edge 102 lies (at least partially) in a plane of symmetry that is disposed midway between the first passage 94 and the second passage 96. Due to the conical regions 98, the separating edge 102 curves towards the output side 92.

The guide device 22 is disposed in the device 1 shown in FIG. 1 such that the axes extending centrally through the first passage 94 and the second passage 96 also respectively extend centrally through the through-openings 88 of the cutters 38, 42 in the open cutter position, as shown in FIG. 5A. In other words, the guide device 22 is disposed and formed such that when two cable ends 16, 18 are inserted through the guide device 22 from the insertion side 90 to the output side 92, the cable ends 16, 18 can be guided through the through-openings 88 of the cutters 38, 42 substantially without contacting the cutting edges 64, 68, 80, 82. As is apparent from FIG. 2, the passages 94, 96 and the through-openings 88 each lie on the same axis and in one plane.

The operation and function of the cable stripping device, as shown in FIGS. 1 and 2, will be described in the following.

First, the cutting device 30 is moved to an initial position, i.e. the base plate 32 is moved to a position wherein the cutters 38, 42 are disposed relatively close (preferably 0.1 mm to 5 cm) to the guide device 22. The cutters 38, 42 are moved by the second and third drive devices 36, 40 into the open cutter position, wherein extensions of the central axes of the through-openings 88 correspond to or are collinear with the central axes of the first and second passages 94, 96. The electric line 10 is inserted into the guide device 22 in the negative X-direction (i.e., from the right to the left in FIG. 1.) At this time, both cable ends 16, 18 preferably extend parallel to each other in a horizontal plane. This can be achieved in a simple manner by turning (rotating) the cable about its longitudinal axis. The first cable end 16 is separated from the second cable end 18 by the separating edge 102, and each cable end 16, 18 is guided into one of the passages 94, 96. The first cable end 16 is guided through the conical region 98 into the tubular region 100 of the first passage 94. The second cable end 18 is guided through the conical region 98 into the tubular region 100 of the second passage 96. The electric line 10 is moved further in the negative X-direction through the guide device 22 and the through-openings 88 of the cutters 38, 42 until the sensor 44 detects, for example, that the first cable end 16 and the second cable end 18 protrude sufficiently far from the rear side of the first cutter 38 in the negative X-direction. The sensor 44 then outputs a signal to the control device 50. The control device 50 subsequently outputs a signal to close the fixing device 20 onto the electric line 10. As a result, the fixing device 20 clamps the electric line 10 by firmly closing the not-shown jaws.

In the next step the cutters 38, 42 are moved in the positive and negative Y-directions respectively, by the second and third drive devices 36, 40, into the stripping-cutting position shown in FIG. 5C. In particular, both the first cutter 38, due to the second drive device 36, and the second cutter 42, due to the third drive device 40, are preferably moved towards each other in a symmetrical manner. Therefore, the V-shaped regions 64b and the central semicircular regions 64c of the cutting edges of the first and second cutters 38, 42 simultaneously cut into the insulation material of the cable ends 16, 18 from both (opposite) sides, perpendicular to the direction of the cable ends. More specifically, the first cutting edge 64 cuts into the insulation material of the first cable end 16 in the positive Y-direction, while the third cutting edge 80 simultaneously cuts into the insulation material of the first cable end 16 in the negative Y-direction, i.e. in the opposite direction. Simultaneously the second and fourth cutting edges 68, 82 cut into the second cable end 18 in the same manner. Due to the V-shaped form of the cutting edges, each cable end is automatically guided in a centered manner between each two cutting edges. Due to the simultaneous movement of both cutters 38, 42, the cable ends 16, 18 remain in the same or substantially in the same position throughout the cutting process. Upon reaching the stripping-cutting position of the cutters 38, 42, i.e. when the through-openings 88 between the first/second cutting edge 64/68 and the third/fourth cutting edge 80/82 have been reduced so much that only the circular through-openings 88 remain (see FIG. 5C), the insulation material is annularly severed and separated in the longitudinal direction. The circular through-openings 88 in this cutter position preferably have substantially the same, or a slightly greater, diameter than the conductors of the cable ends 16, 18. In this case, it is possible to completely cut through the insulation material, while the conductor (core, i.e. the bare metal) is not damaged by the cutting edges 64, 68, 80, 82.

In the next step, the first drive device 34 moves the cutting device 30, together with the cutters 38, 42 that are (remain) held in the stripping-cutting position, in the negative X-direction, i.e. in the longitudinal direction of the cable ends 16, 18, away from the guide device 22 and the fixing device 20. Since the (exposed) wires (conductors or cores) are not, or only lightly, contacted by the cutting edges 64, 68, 80, 82, only the sleeve-shaped cut-off insulation material is removed from the cable ends 16, 18. Upon being pulled off, the severed insulation material falls into the insulation material collecting trough 46. After returning the cutting device 30 into a position wherein the cutters 38, 42 are preferably moved back in the negative X-direction away from the guide device 22 out of the region between multiple crimp anvil 48 and multiple crimp punch 52, the stripping-cutting process is concluded.

The downstream (following or subsequent) crimping process in the crimping device, which is partially shown in FIGS. 1 and 2, will be described in the following. Crimp connectors or crimp sleeves are manufactured by a combined punching- and shaping-technique. Crimp connectors can be manufactured for shipment and for further processing such that they are held at their ends by parallel-extending carrier strips (metal connecting strips or bars), which are preferably formed from the same (metal) material as the crimp connectors. Adjacent crimp connectors are therefore held in this linked structure at a predetermined central axis spacing (i.e. the spacing (distance) of adjacent central axes of the crimp connector) with respect to one another. Using a crimp connector supplying device 49, as shown in FIG. 1, the crimp connectors 49a held in the carrier strips 49b are supplied to and loaded onto the multiple crimp anvil 48. The crimp connector supplying device 49 ensures that the carrier strips 49b linked to the crimp connectors 49a are moved such that the crimp connectors 49a can be automatically loaded onto the multiple crimp anvil 48 without being released from the carrier strips 49b. The predetermined center spacing of the crimp connectors 49a (i.e. the spacing of their central axes) corresponds to the first distance a1. That is, either the spacing of the crimp connectors 49a is chosen such that it corresponds to the distance a1, or vice versa. In the next step the multiple crimp punch 52 is lowered from above onto the multiple crimp anvil 48, whereby the two crimp connectors 49a are respectively crimped onto the two stripped cable ends 16, 18. The crimp connectors 49a are simultaneously detached (severed) from the carrier strips 49b during this crimping process. In a last step the multiple crimp punch 52, the multiple crimp anvil 48, the cutting device 30 and/or the crimp connector supplying device are moved to their initial positions and the fixing device 20 is disengaged. The stripped and crimped cable can then be removed. With the present device, the linked structure of the carrier strips 49b and the crimp connectors 49a can be used for mechanically supplying and processing the crimp connectors 49a. In particular, by supplying the crimp connectors 49a without separating them from the carrier strips 49b, a realignment of the crimp connectors 49a is not necessary. In this respect, it is noted that the crimp connector supplying device 49 may be implemented using any suitable transporting or conveying means, which is capable of transporting the carrier strips 49b and setting the crimp connectors 49a, which are attached thereto, onto or in the multiple crimp anvil 48. For example, the crimp connector supplying device 49 may preferably comprise, e.g., one or more conveying belts and/or one or more toothed gears configured to engage with the carrier strips 49b. For example, one or more toothed gears may engage the carrier strips 49b in a rack-and-pinion manner, whereby the rotating gears act as the pinion and the carrier strips 49b having the equally-spaced-apart crimp connectors 49a linked thereto act as the linearly-moving rack. For the sake of clarity, the crimp connector supplying device 49 is not illustrated in FIG. 2.

Using the above-described exemplary guide device it is possible to arrange and hold two adjacent cable ends, which extend parallel to each other, at a predetermined distance to each other. Due to the formation of two cutting edges in each cutter at a predetermined distance to each other, as well as the opposing arrangement of the cutting edges of each cutter, it is possible, at two cutting positions which are disposed at a predetermined distance to each other, to simultaneously cut into two different cable ends. The insulation material of the two cable ends can thus be simultaneously severed and pulled off. Due to the opposing simultaneous movement of the two cutters, it is possible to sever the insulation material without changing or substantially changing the positions of the cable ends during the cutting. This is further aided by the V-shaped formation of the cutting edges and the semicircular central region of the cutting edges. Since the center distances of the crimp connectors on the carrier strips and the center distances of the passages through the guide device and the center spacings of the passages through the cutter are disposed at the same distance to each other, the entire process can be sped up. In this way it is possible to crimp the crimp connectors onto the stripped cable ends directly, without an alignment and rearrangement of the carrier strips and without an intermediate step. The cable ends also are not required to be reoriented in an intermediate step between the stripping process and the crimping process. Rather, this occurs automatically during the insertion of the two cable ends.

In a further embodiment, after reaching the stripping-cutting position as shown in FIG. 5C, the cutters 38, 42 are each moved a small amount (minimally) in the directions that are opposite to their respective cutting directions. That is, the cutters 38, 42 are opened (vented) again slightly, i.e. so that the through-openings 88 slightly enlarge. In this way, when the insulation material is pulled off (i.e. during the movement of the cutting device 30 away from the cable ends 16, 18), the conductors (bare wires) of the cable ends are less likely to be damaged less the cutting edges.

In a further embodiment, which can be combined with one of the above-mentioned embodiments, after cutting into the insulation material in order to strip it in the first step, the cutting device 30 is moved to a predetermined distance away from the guide device 22, whereby the severed insulation material is moved in the negative X-direction. This predetermined distance preferably corresponds to the desired length of the stripped region (bare metal) at the cable ends 16, 18. The cutters 38, 42 are subsequently moved into the fully-closed position shown in FIG. 5D, whereby the wires (conductors) of the cable ends 16, 18 are also completely severed. Stripped cable ends can thereby be manufactured with defined (pre-determined) lengths of the bare metal (exposed conductor). Alternatively, the cable ends 16, 18 can also be cut off to a predetermined length before the stripping. In this case a corresponding movement of the cutting device 30 away from the guide device 22 takes place after the insertion of the cable ends. The cable ends are then cut off before the above-described stripping process starts by opening the cutters 38, 42 and moving the cutting device 30 rearward.

Furthermore, the device can also be further developed (modified) such that more than two adjacently disposed cable ends are simultaneously stripped and then crimped. Alternatively or additionally, a plurality of cable ends disposed one-over-the-other and adjacently can be stripped. In a further embodiment, the cutting device 30 can also be rigidly mounted so that no movement is possible towards and away from the guide device 22. In this case the insulation material is pulled off by pulling the conductors (cable ends 16, 18) out from the guide device 22. That is, all cable ends are moved together in parallel in the same direction.

The cutters and the corresponding drive devices can also be disposed on a plurality of base plates which are formed independently of one another and are movable independently of one another. For example, one of the cutters can be disposed opposite the other cutters or opposite the other drive devices on the plane of symmetry that extends through the guide device. In this case identically-formed cutters can preferably be used, wherein the cutting edges oppose each other due to the opposing arrangement. The base plate can also be arranged in a C-shape around the guide device.

The first spacing a1 is preferably between 1 mm and 15 mm, more preferably between 2 mm and 10 mm, more preferably between 3 mm and 9 mm, and more preferably between 4 mm and 7 mm, such as, for example, 4 mm, 5 mm, or 6.75 mm.

The first thickness d1 is preferably between 0.1 mm and 5 mm, more preferably between 0.5 mm and 2 mm, and more preferably between 0.9 mm and 1.3 mm, such as, for example, 0.9 mm, 1 mm, or 1.2 mm.

The second thickness d2 is preferably between 0.1 mm and 5 mm, more preferably between 0.5 mm and 2 mm, and more preferably between 0.9 mm and 1.3 mm, such as for example 0.9 mm, 1 mm, or 1.2 mm.

The first length l1 is preferably between 30 mm and 200 mm, more preferably between 40 mm and 100 mm, and more preferably between 50 mm and 70 mm, such as, for example, 60 mm, 63 mm, and 64.3 mm.

The second length l2 is preferably between 5 mm and 20 mm, more preferably between 7 mm and 12 mm, such as, for example, 9 mm, 10 mm, or 11 mm.

The third length l3 is preferably between 0.2 mm and 5 mm, more preferably between 0.5 mm and 3 mm, and more preferably between 0.6 mm and 2.6 mm, such as, for example, 0.6 mm, 1.4 mm, and 2.6 mm.

The fourth length l4 is preferably between 0.1 mm and 3 mm, more preferably between 0.5 mm and 2 mm, and more preferably between 0.8 mm and 1.2 mm, such as, for example, 0.9 mm, 1 mm, and 1.1 mm.

The fifth length l5 is preferably between 15 mm and 150 mm, more preferably between 20 mm and 70 mm, and more preferably between 25 mm and 40 mm, such as, for example, 28 mm, 30 mm, and 32 mm.

The first width b1 is preferably between 5 mm and 25 mm, more preferably between 8 mm and 20 mm, and more preferably between 10 mm and 15 mm, such as, for example, 10 mm, 11 mm, or 12 mm.

The second width b2 is preferably between 5 mm and 25 mm, more preferably between 7 mm and 20 mm, and more preferably between 8 mm and 15 mm, such as, for example, 8 mm, 9 mm, or 10 mm.

The third width b3 is preferably between 2 mm and 15 mm, more preferably between 3 mm and 9 mm, and more preferably between 5 mm and 8 mm, such as, for example, 7 mm or 8 mm.

The fourth width b4 is preferably between 2 mm and 15 mm, more preferably between 3 mm and 9 mm, and more preferably between 5 mm and 8 mm, such as, for example, 6 mm or 7 mm.

The fifth width b5 is preferably between 5 mm and 25 mm, more preferably between 8 mm and 20 mm, and more preferably between 10 mm and 15 mm, such as, for example, 10 mm, 11 mm, or 12 mm.

The angle $\alpha$ is preferably between 80° and 150°, more preferably between 90° and 140°, and more preferably between 100° and 135°, such as, for example, 125°, 130°, and 135°.

The radius R1 of the semicircular cutting edge is preferably between 0.1 mm and 2 mm, more preferably between 0.2 mm and 1.2 mm, and more preferably between 0.3 mm and 0.8 mm, such as, for example, 0.45 mm, 0.55 mm, 0.66 mm, or 0.8 mm.

The material for the cutters is preferably a high speed (tool) steel, such as 1.3344 HSS (ANSI: M2 steel, composition: 1.2% C, 0.45% Si, 4.15% Cr, 5.0% Mo, 1.85% Vm 6.35%, 0.4% Mn, 0.03% P, 0.03% S, the balance being Fe and unavoidable impurities, if any) and is preferably hardened and tempered (62+3 HRC) and coated with TiN.

In the following, further, non-limiting aspects and embodiments of the present disclosure are provided:

According to a first aspect, the device for simultaneous stripping at least a first cable end 16 surrounded by insulation material and a second cable end 18 surrounded by insulation material, includes:

a cutting device 30 including a first cutter 38 and a second cutter 42 that are movable relative to each other in a first direction Y and have cutting edges 64, 68, 80, 82 that are disposed substantially in the same plane, wherein the cutting device 30 is adapted to move the cutting edges 64, 68, 80, 82 of the two cutters 38, 42 towards each other such that the respective cutting edges 64, 68, 80, 82 simultaneously cut into the insulation material of the two cable ends 16, 18, the first cutter 38 has at least a first cutting edge 64 and a second cutting edge 68, which both cut in the first direction Y perpendicular to the longitudinal direction of the cable ends 16, 18 and which are spaced from each other by a first distance a1 in the first direction Y, the second cutter 42 has at least a third cutting edge 80 and a fourth cutting edge 82, which both cut in a second direction that is opposite of the first direction Y and are spaced from each other in the first direction Y by the first distance a1, and the cutting device 30 is movable to simultaneously pull-off of the insulation material from the first and second cable ends 16, 18 and to strip the first and second cable ends 16, 18.

In other words, the at least two cable ends 16, 18, which preferably extend in parallel in the same direction, are preferably disposed in parallel in a plane (in the present embodiment, the X-Y plane), and the two cutters 38, 42 move in opposite directions relative to each other in this plane or parallel thereto in order to strip the cable ends.

In further aspects and embodiments of the present disclosure, each cutter can also have more than two, e.g., three, four or five, cutting edges, which are disposed at a predetermined distance from each other and cut in the same first direction or a direction opposite thereto against the corresponding cutting edges in the second cutter, so that, e.g., three, four or five cable ends can be simultaneously stripped.

According to a further aspect of the present disclosure, a method for simultaneously stripping at least two cable ends 16, 18 surrounded by insulation material, includes the following steps:

inserting at least two parallel-extending cable ends 16, 18 in the same direction in the corresponding number of through-openings 88 that respectively extend through a first cutter 38 and a second cutter 42, wherein each through-opening 88 is delimited by a cutting edge of a first cutter 38 and a cutting edge of a second cutter 42 of a cutting device 20, simultaneously moving the cutting edges to cut into the insulation material of the cable ends 16, 18 by moving the first cutter 38 relative to the second cutter 42 in a first direction Y, which extends perpendicular to the longitudinal direction of the cable ends 16, 18 and parallel to or in the first plane, so that the sizes of the through-openings 88 are reduced, simultaneously pulling-off the insulation material from the cable ends 16, 18 by integrally moving the cutters 38, 42 relative to the cable ends 16, 18 in the longitudinal direction of the cable ends 16, 18 or by integrally moving the cable ends 16, 18 relative to the cutting direction 30 in the longitudinal direction of the cable ends 16, 18.

The individual through-openings 88, which are delimited by the cutters (i.e. cutting edges defined in the cutters 38, 42), are preferably each completely surrounded (enclosed) by the cutters 38, 42.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved cable stripping devices and cutters therefor, as well as method for stripping insulating materials from cables.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

It is explicitly emphasized that all of the features disclosed in the description and/or the claims should be considered as separate and independent from one another for the purpose of the original disclosure as well as for the purpose of limiting the claimed invention, independent of the combinations of features in the embodiments and/or the claims. It is explicitly stated that all range specifications or specifications of groups of units disclose every possible intermediate value or subgroup of units for the purpose of the original disclosure as well as for the purpose of limiting the claimed invention, in particular also as the limit of a range specification.

REFERENCE NUMBER LIST

10 Electric line
12 First insulated cable
14 Second insulated cable
16 First cable end
18 Second cable end
20 Fixing device
22 Guide device
30 Cutting device
32 Base plate
34 First drive device
36 Second drive device
38 First cutter
40 Third drive device
42 Second cutter
44 Sensor
46 Insulation material collecting trough
48 Multiple crimp anvil
50 Control device
52 Multiple crimp punch
54 Front surface
56 Rear surface
58 Guide region
60 Cutting region
62 First cutout
64 First cutting edge
64a Cutting edge border region
64b V-shaped cutting edge region
64c Semicircular cutting edge region
66 Second cutout
68 Second cutting edge
70 Third cutout
72 Guide region
74 Cutting region
76 Third cutout
78 Fourth cutout
80 Third cutting edge
82 Fourth cutting edge
84 Rear surface
86 Front surface
88 Through-opening
90 Insertion side
82 Output side
94 First passage
96 Second passage
98 Conical region
100 Tubular region
102 Separating edge

The invention claimed is:

1. A device for simultaneous stripping at least a first cable end surrounded by insulation material and a second cable end surrounded by insulation material, the device comprising:
a first cutter that is movable relative to a second cutter in a first direction that is perpendicular to a longitudinal direction of the first and second cable ends,
wherein the first cutter has a first cutting edge and a second cutting edge spaced apart by a predetermined distance in the first direction, the first cutting edge and the second cutting edge both being configured to cut when moved in the first direction,
the second cutter has a third cutting edge and a fourth cutting edge spaced apart by the predetermined distance in the first direction, the third cutting edge and the fourth cutting edge both being configured to cut when moved in a second direction opposite to the first direction,
the first, second, third and fourth cutting edges are disposed substantially in a first plane that contains the first and second directions,
the first and second cutting edges of the first cutter are configured to respectively move towards and adjacent to the third and fourth cutting edges of the second cutter to simultaneously cut into the insulation material of the first and second cable ends, and
the first cutter and the second cutter are movable in a third direction substantially parallel to the longitudinal direction to simultaneously pull the insulation material off the first and second cable ends in order to strip the first and second cable ends.

2. The device according to claim 1, wherein:
the first cutter and the second cutter are formed, and are disposed with respect to each other, such that: (i) the first cutting edge and the third cutting edge are configured to cut into the insulation material of the first cable end, (ii) the second cutting edge and the fourth cutting edge are configured to cut into the insulation material of the second cable end, and (iii) the first, second, third and fourth cutting edges are configured to cut substantially simultaneously.

3. The device according to claim 1, further comprising:
a guide device configured to guide the first and second cable ends during insertion of the first and second cable ends into the cutting device,
wherein the guide device is configured such that, after being inserted therein, the first and second cable ends are held by the guide device such that the first and second cable ends do not move, or do not substantially move, while the first, second, third and fourth cutting edges respectively cut into the insulation material of the first and second cable ends.

4. The device according to claim 3, wherein:
in an open state of the cutting device, first and second through-openings for respectively guiding the first and second cable ends through the first and second cutters are respectively formed between the first cutting edge and the third cutting edge, and between the second cutting edge and the fourth cutting edge, and
the guide device is configured to respectively guide the first and second cable ends into the first and second through-openings.

5. The device according to claim 3, wherein the guide device includes at least a first funnel-shaped passage and a second funnel-shaped passage each having a conical region and a tubular region.

6. The device according to claim 5, wherein a wall of the first funnel-shaped passage meets a wall of the second funnel-shaped passage to form a wedge configured to separate the first cable end from the second cable end when the first cable end and second cable end are pressed against the wedge in the longitudinal direction.

7. The device according to claim 3, wherein the guide device includes a wedge configured to separate the first cable end from the second cable end when the first cable end and second cable end are pressed against the wedge in the longitudinal direction.

8. The device according to claim 1, wherein:
the first cutter and the second cutter are further formed, and are disposed with respect to each other, such that the first cutting edge and the third cutting edge are configured to completely sever the first cable end, and the second cutting edge and the fourth cutting edge are configured to completely sever the second cable end.

9. The device according to claim 1, further including a clamp configured to hold the first and second cable ends so that the first and second cable ends do not move, or do not substantially move, while the first, second, third and fourth cutting edges respectively cut into the insulation material of the first and second cable ends.

10. The device according to claim 9, further including a drive configured to move the first cutter relative to the clamp in the longitudinal direction of the first and second cable ends to pull the insulation material off the first and second cable ends.

11. A device for simultaneous stripping at least a first cable end surrounded by insulation material and a second cable end surrounded by insulation material, the device comprising:
a cutting device including a first cutter that is movable relative to a second cutter in a first direction that is perpendicular to a longitudinal direction of the first and second cable ends,
wherein the first cutter has a first cutting edge and a second cutting edge spaced apart by a predetermined distance in the first direction, the first cutting edge and the second cutting edge both being configured to cut when moved in the first direction,
the second cutter has a third cutting edge and a fourth cutting edge spaced apart by the predetermined distance in the first direction, the third cutting edge and the fourth cutting edge both being configured to cut when moved in a second direction opposite to the first direction,
the first, second, third and fourth cutting edges are disposed substantially in a first plane that contains the first and second directions,
the first and second cutting edges of the first cutter are configured to respectively move towards and adjacent to the third and fourth cutting edges of the second cutter to simultaneously cut into the insulation material of the first and second cable ends, and
the cutting device is movable to simultaneously pull-off the insulation material from the first and second cable ends in order to strip the first and second cable ends,
the device further comprising:
a guide device configured to guide the first and second cable ends during insertion of the first and second cable ends into the cutting device,
wherein
the guide device is configured such that, after being inserted therein, the first and second cable ends are held by the guide device such that the first and second cable ends do not move, or do not substantially move, while the first, second, third and fourth cutting edges respectively cut into the insulation material of the first and second cable ends,
the guide device includes at least two funnel-shaped passages disposed in parallel, each having a conical region and a tubular region,
starting from an insertion side of each funnel-shaped passage, the conical region tapers and then transitions into the tubular region, which ends at an output side of the funnel-shaped passage, and
as viewed in a longitudinal direction of the funnel-shaped passages, the conical region of the first passage at least partially overlaps with the conical region of the second passage.

12. A device for stripping and crimping at least first and second cable ends surrounded by insulation material, comprising:
a cutting device including a first cutter that is movable relative to a second cutter in a first direction that is perpendicular to a longitudinal direction of the first and second cable ends,
wherein the first cutter has a first cutting edge and a second cutting edge spaced apart by a predetermined distance in the first direction, the first cutting edge and the second cutting edge both being configured to cut when moved in the first direction,
the second cutter has a third cutting edge and a fourth cutting edge spaced apart by the predetermined distance in the first direction, the third cutting edge and the fourth cutting edge both being configured to cut when moved in a second direction opposite to the first direction,
the first, second, third and fourth cutting edges are disposed substantially in a first plane that contains the first and second directions,
the first and second cutting edges of the first cutter are configured to respectively move towards and adjacent to the third and fourth cutting edges of the second cutter to simultaneously cut into the insulation material of the first and second cable ends,
the cutting device is movable to simultaneously pull-off the insulation material from the first and second cable ends in order to strip the first and second cable ends,
the device further comprising:
a guide device configured to guide the first and second cable ends during insertion of the first and second cable ends into the cutting device,
wherein the guide device is configured such that, after being inserted therein, the first and second cable ends are held by the guide device such that the first and second cable ends do not move, or do not substantially move, while the first, second, third and fourth cutting edges respectively cut into the insulation material of the first and second cable ends,
and
a crimping device including
a crimp connector supplying device configured to supply crimp connectors, which are held on at least one carrier strip at a predetermined center distance to one another, and
a multiple crimp punch and a multiple crimp anvil configured to cooperate with each other to respectively connect at least two of the crimp connectors to the first and second cable ends after they have been stripped of the insulation material, wherein the first and second cable ends are held by the guide device or by the first second, third and fourth cutting edges at a center distance that at least substantially equals the predetermined center distance of the crimp connectors held on the at least one carrier strip.

13. A device for simultaneous stripping at least a first cable end surrounded by insulation material and a second cable end surrounded by insulation material, the device comprising:
- a cutting device including a first cutter that is movable relative to a second cutter in a first direction that is perpendicular to a longitudinal direction of the first and second cable ends, and
- a guide device is configured to guide the first and second cable ends during insertion of the first and second cable ends into the cutting device,
- wherein the first cutter has a first cutting edge and a second cutting edge spaced apart by a predetermined distance in the first direction,
- the second cutter has a third cutting edge and a fourth cutting edge spaced apart by the predetermined distance in the first direction,
- the first, second, third and fourth cutting edges are disposed substantially in a first plane that contains the first direction,
- the first and second cutting edges of the first cutter are configured to respectively move towards and adjacent to the third and fourth cutting edges of the second cutter such that the first and third cutting edge cut into the insulation material of the first cable end simultaneously with the second and fourth edges cutting into the insulation material of the second cable end,
- the guide device is configured such that, after being inserted therein, the first and second cable ends are held by the guide device such that the first and second cable ends do not move, or do not substantially move, while the first, second, third and fourth cutting edges respectively cut into the insulation material of the first and second cable ends, and
- the cutting device is movable to simultaneously pull the insulation material off the first and second cable ends in order to strip the first and second cable ends by increasing a distance in the longitudinal direction between the first and second cutters and the guide device.

14. The device according to claim 13, further including a drive configured to move the first cutter relative to the guide device in the longitudinal direction.

* * * * *